United States Patent
De Bruijn et al.

(10) Patent No.: US 12,470,417 B2
(45) Date of Patent: Nov. 11, 2025

(54) SPLITTING UNIT FOR A SINGLE PAIR ETHERNET HYBRID LINE AND HYBRID ETHERNET POWER SYSTEM

(71) Applicants: TE Connectivity Nederland BV, s'Hertogenbosch (NL); TE Connectivity Germany GmbH, Bensheim (DE)

(72) Inventors: Jeroen Joszef Maria De Bruijn, S'Hertogenbosch (NL); Wijnand Van Gils, s-Hertogenbosch (NL); Peter Dirk Jaeger, s-Hertogenbosch (NL); Michael Hilgner, Bensheim (DE)

(73) Assignees: TE Connectivity Germany GmbH, Bensheim (DE); TE Connectivity Nederland B.V., S-Hertogenbosch (NL)

( * ) Notice: Subject to any disclaimer, the term of this patent is extended or adjusted under 35 U.S.C. 154(b) by 191 days.

(21) Appl. No.: 18/331,267

(22) Filed: Jun. 8, 2023

(65) Prior Publication Data
US 2023/0412406 A1  Dec. 21, 2023

(30) Foreign Application Priority Data
Jun. 8, 2022 (EP) .................................... 22177856

(51) Int. Cl.
*H04L 12/10* (2006.01)
*H04L 12/46* (2006.01)

(52) U.S. Cl.
CPC .......... *H04L 12/10* (2013.01); *H04L 12/4625* (2013.01)

(58) Field of Classification Search
CPC ........................... H04L 12/10; H04L 12/4625
See application file for complete search history.

(56) References Cited

U.S. PATENT DOCUMENTS

| 10,547,566 B2 | 1/2020 | Smart et al. |
| 10,631,443 B2 * | 4/2020 | Byers ................. H05K 7/20218 |

(Continued)

FOREIGN PATENT DOCUMENTS

| CN | 201130559 Y * | 10/2008 |
| EP | 2600564 A2 | 6/2013 |

(Continued)

OTHER PUBLICATIONS

Extended European Search Report from the European Patent Office dated Nov. 24, 2022, corresponding to Application No. 22177856.6-1216, 18 pages.

(Continued)

*Primary Examiner* — Freshteh N Aghdam
(74) *Attorney, Agent, or Firm* — Barley Snyder

(57) ABSTRACT

A splitting unit for a single pair Ethernet (SPE) hybrid line includes an input connection element, a first output connection element, a second output connection element, and an active unit providing power and data at the second output connection element. The input connection element, the first output connection element, and the second output connection element transfer power and data. The active unit has a power sourcing equipment (PSE) connected to the input connection element and to at least one of the first output connection element and the second output connection element. The PSE taps power from a power line onto a data line.

19 Claims, 10 Drawing Sheets

(56) References Cited

U.S. PATENT DOCUMENTS

| | | | |
|---|---|---|---|
| 2015/0333918 A1* | 11/2015 | White, III | H04L 12/10 |
| | | | 713/300 |
| 2020/0153515 A1* | 5/2020 | Goergen | G01J 1/4257 |
| 2020/0233472 A1 | 7/2020 | Jones et al. | |
| 2023/0198572 A1* | 6/2023 | Aekins | H04L 12/10 |
| | | | 375/262 |

FOREIGN PATENT DOCUMENTS

| | | | |
|---|---|---|---|
| KR | 101229679 B1 * | 2/2013 | |
| WO | 2021064008 A1 | 4/2021 | |

OTHER PUBLICATIONS

Intellinet: "2-Port Outdoor Vandalproof Gigabit PoE++Extender", Nov. 16, 2022, XP055982261, Retrieved from the Internet: URL:https://s3.amazonaws.com/assets.mhint/downloads/63639/561648_datasheet_english.pdf.

* cited by examiner

SPLITTING UNIT FOR A SINGLE PAIR ETHERNET HYBRID LINE AND HYBRID ETHERNET POWER SYSTEM

CROSS-REFERENCE TO RELATED APPLICATIONS

This application claims the benefit of the filing date under 35 U.S.C. § 119(a)-(d) of European Patent Application No. 22177856.6, filed on Jun. 8, 2022.

FIELD OF THE INVENTION

The present disclosure relates to a splitting unit for a single pair Ethernet (SPE) hybrid line, which transfers power and data, and to a hybrid Ethernet power system.

BACKGROUND

Single Pair Ethernet is intended to enable continuous internet-protocol-based communication from the control level to the field level including power supply, to save costs and to simplify installation. There are different standards such as Institute of Electrical and Electronics Engineers (IEEE) 802.3 bp-2016 (1000Base-T1), IEEE 802.3bw-2015 (100Base-T1) and IEEE 802.3cg-2019 (10Base-T1), which can be used to establish Ethernet connections over copper cables with only a single twisted pair of wires. These standards define different speeds from 10 Mbit/s, over 100 Mbit/s, and up to 1000 Mbit/s. The maximum distances that can be bridged vary between 15 m, 40 m and 1000 m.

Since only a single pair of wires is available for transmitting the full-duplex signals, the signals are transmitted simultaneously in both directions on the pair of wires. The signals run in opposite directions in the cable and overlap.

Analogous to Power over Ethernet for LAN cabling, it is also possible with Single Pair Ethernet to supply devices with the electrical energy required for operation via the copper cable. The Power over Data Line, PoDL, standard IEEE 802.3bu-2016 was created for this purpose, which can supply power of up to 50 W to an external device. It is differed between the power sourcing equipment (PSE), which is responsible for the energy supply, and powered device (PD), which uses the supplied power.

In a hybrid Ethernet system, the power and data signals are provided to the network on a main line, the trunk cable. From this trunk cable, spur cables are branched off, which connect the devices to the main line and ultimately, to the network. There is an aim to reach long spur cable length with a high data transfer rate. There is a need for a splitting unit that creates a tree structured Ethernet system and enables a high data transfer rate over long cable lengths while at the same time not adding disturbance to the signal and enabling a high power density.

SUMMARY

A splitting unit for a single pair Ethernet (SPE) hybrid line includes an input connection element, a first output connection element, a second output connection element, and an active unit providing power and data at the second output connection element. The input connection element, the first output connection element, and the second output connection element transfer power and data. The active unit has a power sourcing equipment (PSE) connected to the input connection element and to at least one of the first output connection element and the second output connection element. The PSE taps power from a power line onto a data line.

BRIEF DESCRIPTION OF THE DRAWINGS

Exemplary embodiments of the invention are described by way of the following drawings. In the drawings.

DETAILED DESCRIPTION OF THE EMBODIMENT(S)

The present disclosure is explained in greater detail using the examples depicted in the Figures. Identical parts are hereby provided with identical reference numbers and identical component names. Furthermore, some features or combinations of features from the various examples shown and described may also represent independent solutions, inventive solutions or solutions according to the disclosure.

The present disclosure is based on the idea that one component, the splitting unit, is provided with an active unit and thus allows the transfer of data and power to a device and a flexible adjustment of the required cable thickness and cable length.

Figure 1:
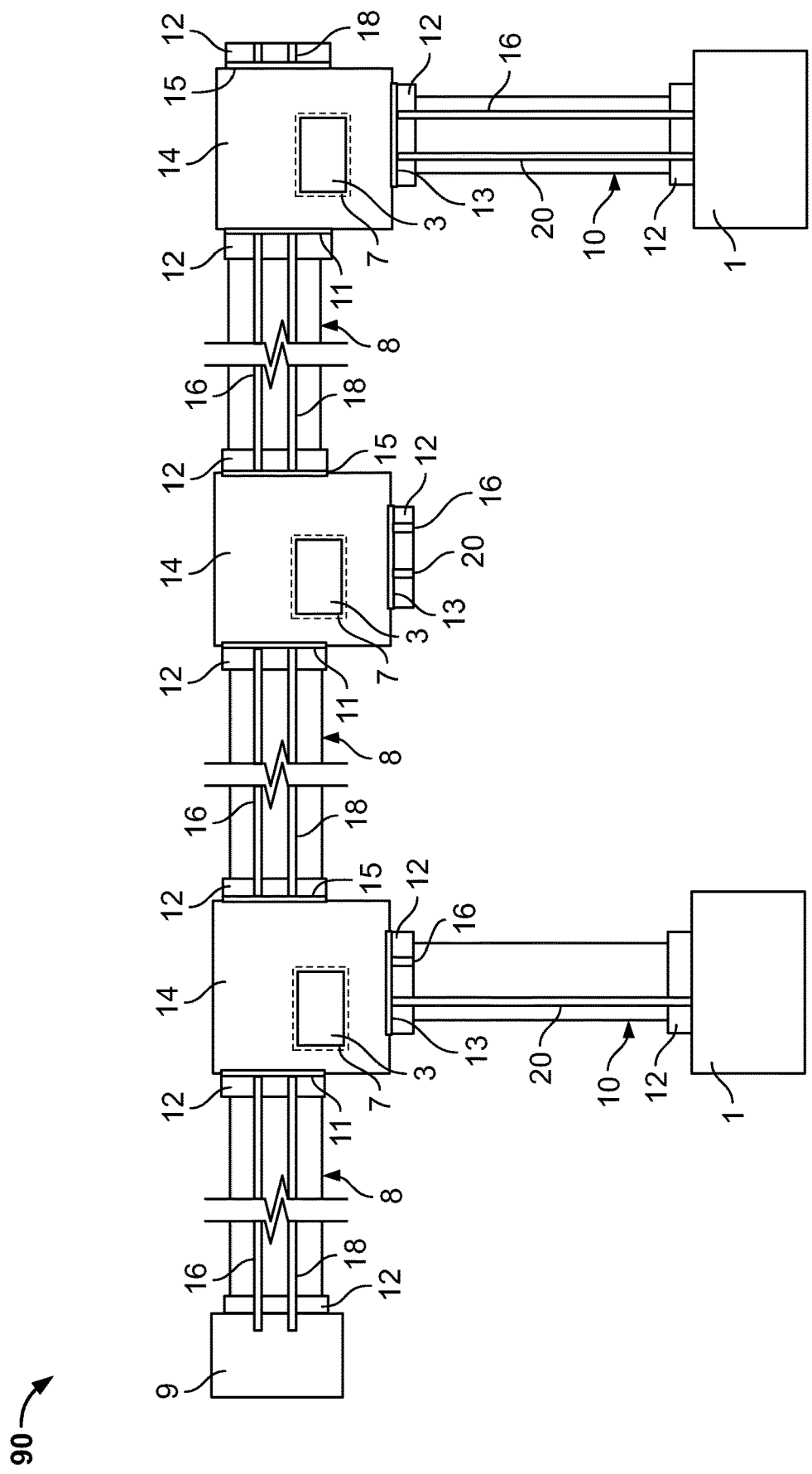
FIG. 1 is a schematic diagram of an Ethernet system with a splitting unit.

FIG. 1 shows a general first example of the Ethernet system and the splitting unit in an abstract version. FIG. 1 provides a general understanding of the topology of an Ethernet system according to the present disclosure and the components thereof. The Ethernet system 90 exemplarily comprises three splitting units 14, one first electronic device 9 and two second electronic devices 1. The system 90 however is not limited to this setup. Any number of splitting units 14 and electronic devices 9, 1 is feasible. Each splitting unit 14 comprises an input connection element 11, a first output connection element 15 and one second output connection element 13. The number of outlets of the splitting unit 14 may vary and can be higher than three. Also, the number of outlets of multiple splitting units 14 in one network may vary among them, depending on the required connected devices. The presented splitting unit 14 provides an easy solution to add an extra branch in the cable structure.

The splitting unit 14 may be formed as an overmolded connecting unit. The input connection element 11, the first output connection element 15, and the at least one second output connection element 13 are as the interface elements of this overmolded connector such that the splitting unit 14 is formed as a one-part compact component that can be easily connected to cables 8, 10 or wires. To connect the splitting unit 14 to the cables 8, 10, the connector elements mate with a mating connector element that is attached to the cables 8, 10.

The outlets of the input connection element 11, the first output connection element 15 and the second output connection element 13 are attached to the cable via a connector 12. The connector 12 can be fixed by a screw, a latch, a push-pull and/or a plug-in connection. However, it is not required that a connector 12 is attached to the outlets 11, 13, 15, but it is also possible to attach the outlets 11, 13, 15 directly at the cables 8, 10 or at wires with a solder connection, a crimp connection, an insulation-displacement connection, screw connection, pierce connection and/or a poke-in connection. Further, it is not required that the three outlets 11, 13, 15 of the splitting unit 14 are connected via the same method. It is possible to connect each outlet of the splitting unit 14 via a different method. Thereby, the connection of the splitting unit 14 with or without connector 12 is field and non-field installable and therefore applicable for many applications.

The mating interface of the connector depends on the signals that are transferred at the respective outlet 11, 13, 15. Depending on the number of lines (data and/or power) that are transferred, the connector 12 may comprise different numbers of pins. The corresponding number of pins for the various embodiments is described in detail further below.

The shown splitting unit 14 is not limited to the depicted T-shape, but may also be in an angled shape, which allows stacking multiple connect multiple splitting units directly to each other. This may be used to add further branches of spur cables to the network system. Further, the splitting unit 14 may also be formed in a Y-shape, or any other known connecting shape. In an embodiment, the splitting unit is angled 90°.

The first splitting unit 14 in FIG. 1 (on the left) is connected via a trunk cable 8 to the first electronic device 9 and to the second splitting unit 14. The trunk cable 8 denotes the main line of the Ethernet network and connects the three depicted splitting units 14 and the first electronic device 9. At the second output connection element 13, the splitting unit 14 is connected to the second electronic device 1 via a spur cable 10. The spur cable 10 denotes a branch of the trunk cable, which directs to the external device. The trunk cable 8 leads a power line 16 and a data line 18 along the three splitting units 14.

The first input connection element 11, the first output connection element 15, and the second output connection element 13 transfer power and data. The splitting unit 14 can operate in various modes. At the second output connection element 13, the splitting unit 14 either provides data and power (via PoDL) on a single line to the second electronic device 1 via the spur cable 10, no spur cable is connected, or in addition to data and power on a single line (via PoDL) one additional power line is passed to the second electronic device 1.

At least power is allocated to the second output connection element 13 by an active unit 7 of the splitting unit 14. The splitting units 14 comprise at least one active unit 7. Depending on the type of active unit 7 and the position, the splitting unit 14 may fulfill different functionalities.

The first electronic device 9 supplies power to the network, whereas the second electronic device 1 is powered by the network. Further, both electronic devices 9, 1 also comprise an integrated circuit for transferring the data and processing it. The supplied power exemplarily has a voltage up to 600V DC with a current of up to 16 A. Therefore, the splitting unit 14 and the network system is applicable for industrial applications such as robots or machines. However, also different voltage and current values are feasible depending on the requirement of various applications.

The first and second electronic device 9, 1 are connected via a connector 12 to the trunk and the spur cable 8, 10 respectively. Alternatively, the first and second electronic device 9, 1 could also be connected directly to cables or wires via one of the above-mentioned methods.

The setup of the system and the components as described above are of course also valid for the following examples of the present disclosure.

Figure 2:
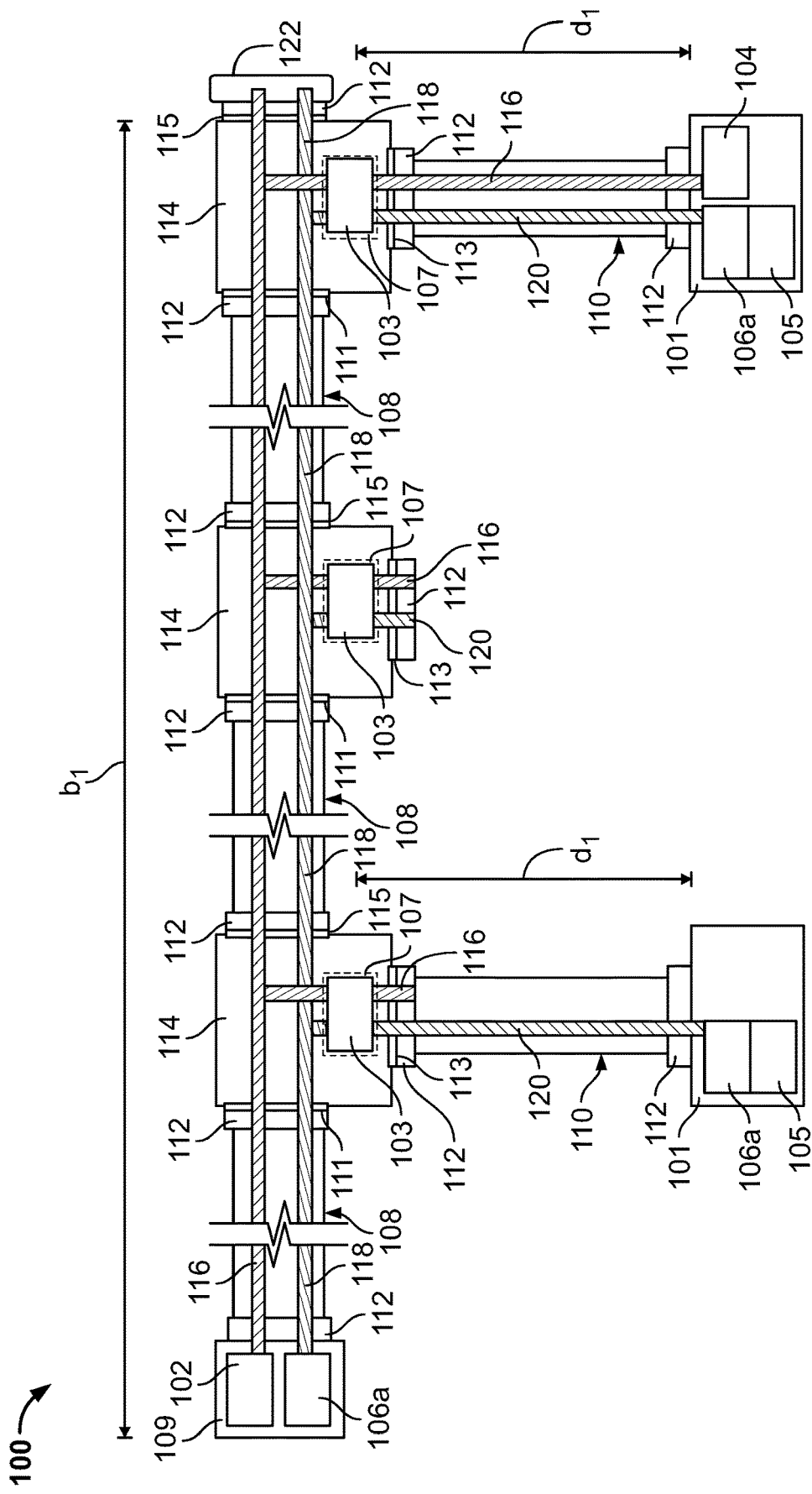
FIG. 2 is a schematic diagram of an Ethernet system with a splitting unit according to the present disclosure.

A first example of the present disclosure with the network in a multidrop topology is shown schematically in FIG. 2. The following figures are advantageous examples thereof.

The IEEE standard 802.3cg was defined for two variants, a short reach variant 10BASE-T1S and a long reach variant 10BASE-T1L. This standard defines a transfer rate of up to 10 Mbit/s. The trunk cable length is defined as 25 m maximum and the spur cable length as 10 cm maximum for 10BASE-T1S. For 10BASE-T1L, the point-to-point cable length is defined as 1000 m maximum.

Further, the short reach variant 10BASE-T1S uses a multidrop topology. To increase the feasible spur cable length for this variant, the splitting unit according to the present invention may be included in such a topology.

In this example shown in FIG. 2, the first electronic device 109 comprises an external (non-PoDL) PSE 102 for supplying power and an integrated circuit 106*a*, exemplarily chosen as PHY, for processing the data. The trunk cable 108 passing along the input connection element 111 and the first output connection element 115 of the splitting units 114 comprises a power line 116 and a data line 118.

The splitting unit 114 comprises one active unit 107, which is a PSE 103. The PSE 103 is connected to the input connection element 111 and the second output connection element 113. The splitting unit 114 splits the data and the power line, and one branch passes through the first output connection element 115 to the second splitting unit 114 and the other branch passes through the second output connection element 113 to the second electronic device 101.

The PSE 103 as part of the splitting unit 114 taps the power from the power line 116 onto the data line 118 only at the branch of the data line passing through the second output connection element 113 and not passing along the trunk cable 108. In this way, longer cable lengths of the trunk cable 108 in comparison to the spur cable 110 can be reached. Although in this embodiment one active unit that comprises one PSE 103 is depicted, it should be clear that also multiple active units and therefore multiple PSEs 103 could be part of the splitting unit.

With the power tapped onto the data line, the second electronic devices 101 are connected to the splitting units 114 at the second output connection element 113 via only one line. This line 120 is a data and power line (via PoDL), which is capable of providing data and power at an integrated circuit 106*a* of the second electronic device 101. This integrated circuit 106*a* can be a PHY. Further, the PoDL cable 120 also provides power for the corresponding power element 105 of the second electronic device 101. The PoDL technology allows providing power and data at the electronic devices 101 via only one twisted cable-pair. Therefore, the spur cable 110 can have a smaller diameter than the trunk cable 108.

At the first output connection element 115, the splitting unit 114 is exemplarily connected to another further splitting unit 114 (in the middle) via the trunk cable 108. Between these splitting units 114, data and power is transferred. With the presented splitting unit 114 in the first example, an exemplary trunk cable length bi can be up to 25 m with an exemplary transfer rate of 10 Mbit/s. The setup allows a reduced number of components even in a large network. The data signal is not refreshed by the splitting unit, such that a feasible spur cable length di that can be reached with this setup is exemplarily 10 cm. The reached cable lengths and the transfer rates in the trunk and spur cable correspond to the requirement for the IEEE 802.3cg standard 10BASE-T1S.

The PSE 102 in combination with the SPE technology allows the transfer of power and data over one pair of copper wires. Therefore, no extra power cable to the device is required, which reduces the costs and enables a smaller diameter of the spur cables in comparison to the trunk cable. The supplied voltage of a PoDL cable 120 is between 6 V and 60 V DC, and the current is in the range of 100 mA and 1.579 A. The maximum power available at the PD according to IEEE 802.3bu or IEEE 802.3cg is 50 W or 52 W, respectively. Thus, by including a PSE 102 to the splitting unit 14 a high power density in the network is achieved.

As can be seen in FIG. 2, the second splitting unit 114 (in the middle), exemplarily depicted with the same components in the active unit as the first splitting unit on the left, is not connected to a second electronic device 101 at the second output connection element 113. Also in this case, the active unit 107 taps the power from the power line onto the data line. However, the provided PoDL 120 at the second output connection element 113 is not further used. The data and the power line in the trunk cable just pass through the splitting unit 114.

The third splitting unit 114 (on the right in FIG. 2) is exemplarily depicted as the last splitting unit for the Ethernet system 100. However, it is clear that also more than three splitting units can be integrated in the system 100. The third splitting unit 114 again is connected via a spur cable to a second electronic device 101. This splitting unit exemplarily includes the same features as the first and second splitting units. However, here the second electronic device 101 is not only connected via one power and data line (via PoDL) 120, but additionally via one power line 116. This power line 116 is a branch of the main power line 116 in the trunk cable 108. With this extra power line 116, a further PD component 104 in the electronic device 101 can be supplied with power. Therefore, the splitting unit 114 not only provides power to one node, which is the standard for the PoDL technology, but also to multiple nodes when additionally providing the separate power line at the second output connection element 113.

FIG. 2 depicts the various modes of the splitting unit 114. Power and data can be distributed on one power and data line (via PoDL), or beside the combined power and data line, an extra power line is provided, or the splitting unit only refreshes the signal without connecting a node.

Depending on the signal that is provided at the outlets 111, 113, 115 of the splitting unit 114, the connector 112 comprises a different number of pins. In this Figure, exemplarily the connectors 112 attached to the outlets 111 and 115, where data and power is transferred via separate lines, comprise four pins. Two pins for the data transfer and two pins for the power transfer, whereas the connector 112 attached to the outlet 113 comprises a different number of pins, depending whether only one power and data line (via PoDL) is provided along the spur cable 110 or additionally one extra power line is provided. In the later, the connector 112 comprises four pins meaning that four wires pass along the spur cable 110 and otherwise the connector 112 comprises only two pins such that two wires pass along the spur cable 110.

As is depicted in FIG. 2, the PoDL technology is only used for the spur cable 110 connecting the external devices 101 to the network and not on the trunk cable 108. This allows transferring more power along a longer trunk cable and establishes the possibility to adapt the various modes of the splitting unit 114 to the connected application. It is also possible to not tap the power from the power line onto the data line and therefore to not connect the second electronic device 101 via PoDL, but instead with a separate power and data line (not shown in the Figures). Depending on the connection mode of the splitting unit 114, the split lines are either connected to the device 101 or just terminated at the second output connection element 113.

Whenever, no second electronic device 101 is connected to the splitting unit 114, the signals are just fed through the trunk line, until at the last splitting unit the signals are terminated by a field termination unit 122. This termination unit can be of any type, and is here exemplarily chosen as terminating the data line with 100 Ohm and the power line with 0.1 μF.

Figure 3:
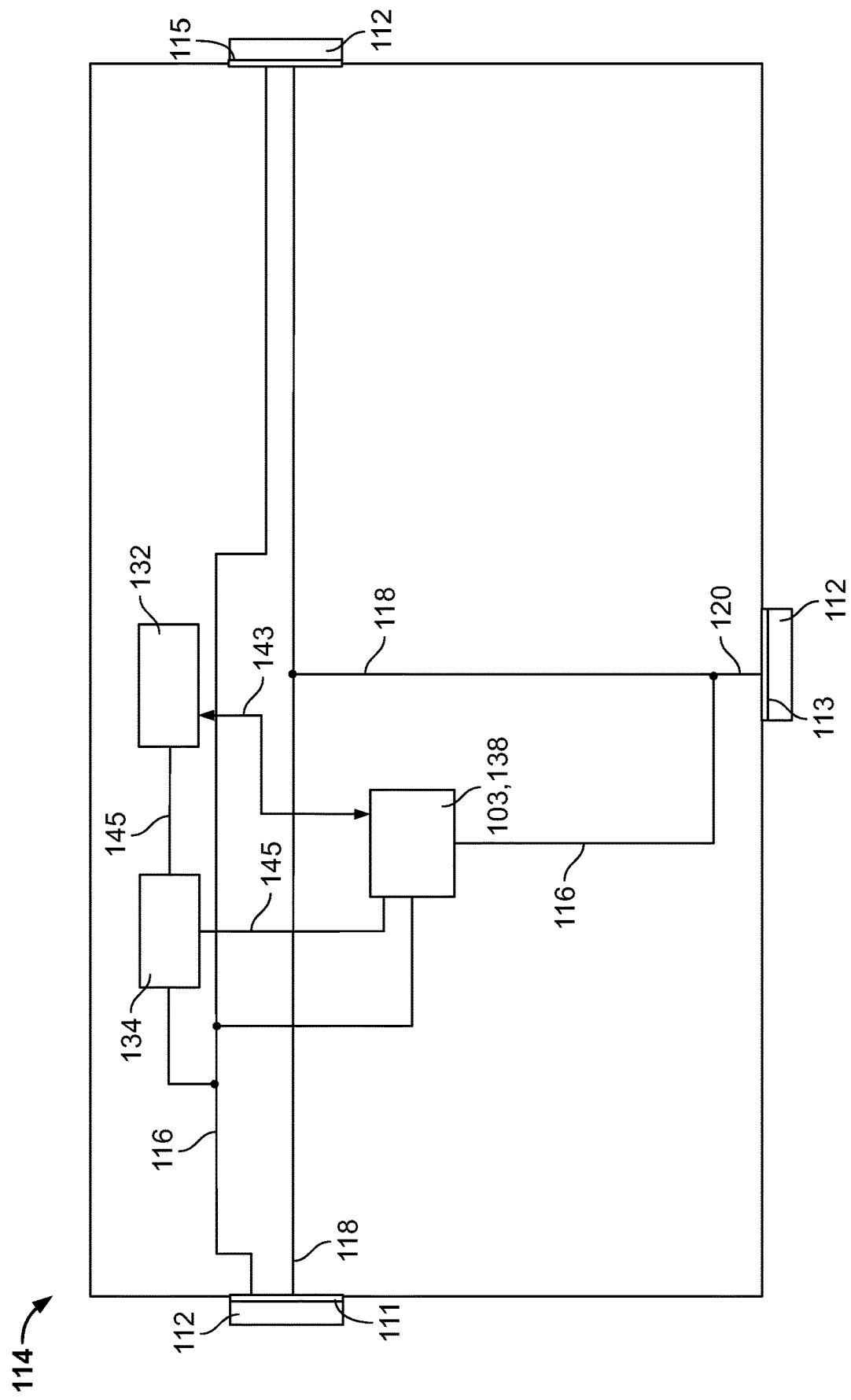
FIG. 3 is a circuit diagram of a splitting unit according to the present disclosure.

An exemplary circuit design of the splitting unit 114 with the PSE 103 is shown in FIG. 3. This exemplary circuit diagram corresponds to the splitting unit 114 with one input connection element 111 and a first output connection element 115, which are provided with power 116 and data 118 via separate lines and a second output connection element 113, which is provided with power and data via one line, PoDL 120.

The power line passing from the first input connection element 111 to the first output connection element 115 is tapped and the branched power line leading to the second output connection element 113 may pass a 1-port PSE controller 138. This controller is operable to control the injection of the power line 116 to the data line 118. Thus, the splitting unit provides only one power and data line (via PoDL) at the second output connection element 113.

The data line 118 passes through the input connection element 111 along the trunk cable to the first output connection element 115. At some point in the splitting unit 114, this data line is tapped and a branch of the data line passes to the second output connection element 113. Before the data line exits the splitting unit 114, the branched power line is tapped onto the data line by the PSE controller 138.

The splitting unit 114 also comprises a host central processing unit (CPU) 132, which is supplied with power by a power supply unit (PSU) 134. The power supply unit 134 converts the power on the power line 116 to a lower power for the components of the splitting unit 114. The converted lower power is also supplied at the PSE controller 138. The host CPU 132 is connected bi-directionally with the PSE controller 138 via a management data input/output (MDIO) 143 interface to read and write the control and status of the PSE controller 138. MDIO is a serial bus that was defined for the Ethernet family of the IEEE 802.3 standard.

Figure 4:
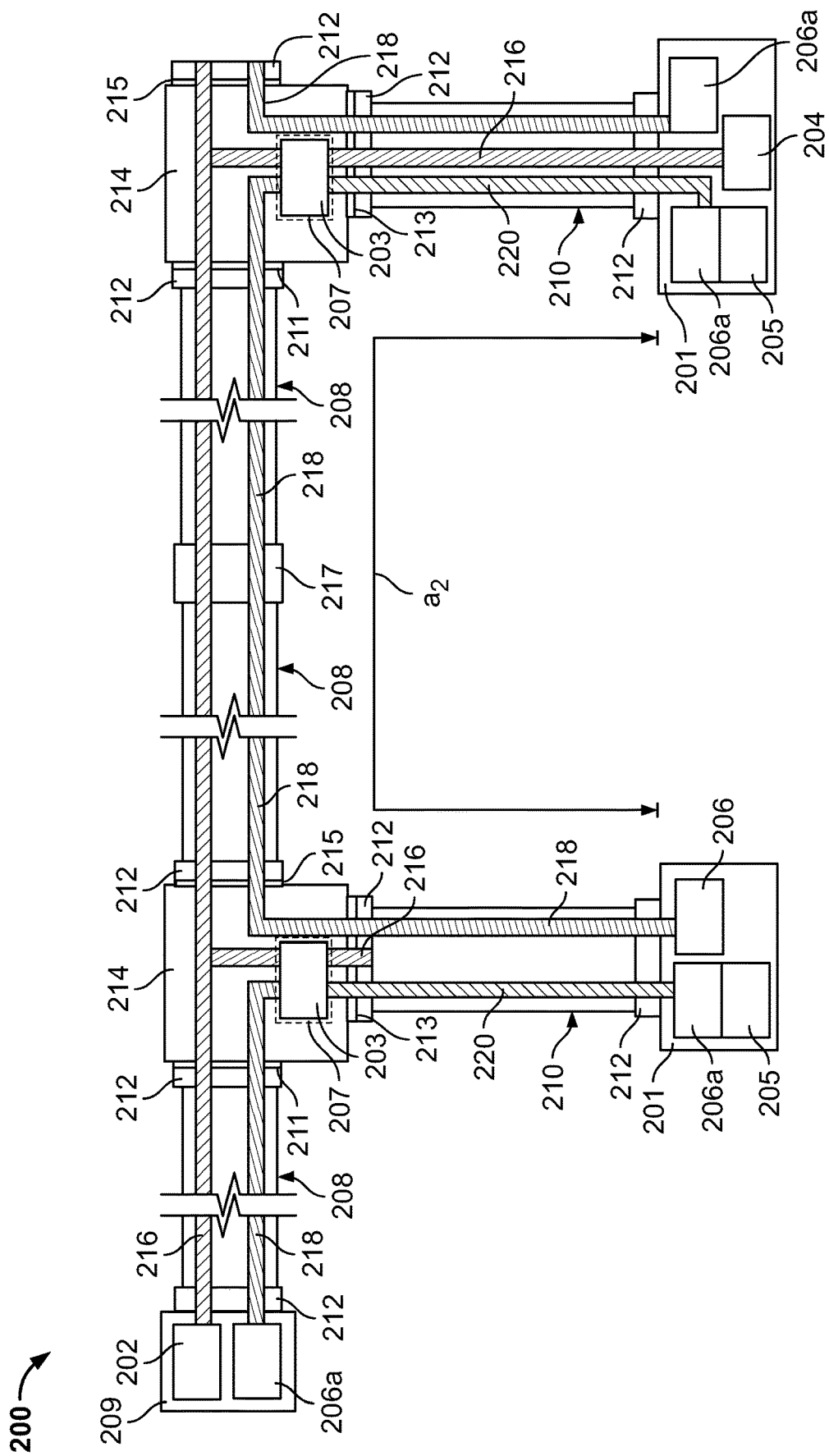
FIG. 4 is a schematic diagram of an Ethernet system with a splitting unit according to another embodiment.

Another further advantageous example of the present disclosure with the network in a Point-to Point (P2P) topology is shown schematically in FIG. 4.

In this example, the first electronic device 209 comprises an external (non-PoDL) PSE 202 for supplying power and an integrated circuit 206a, exemplarily chosen as PHY, for processing the data. The trunk cable 208 passing along the input connection element 211 and the first output connection element 215 of the splitting units 214 comprises a power line 216 and a data line 218.

The splitting unit 214 splits the power line, and one branch passes through the first output connection element 215 to the second splitting unit 214 and the other branch passes through the second output connection element 213 to the second electronic device 201. The data line 218, received through the input connection element 211 is lead to the active unit 207 and then to the second output connection element 213.

On the branch passing through the second output connection element 213, the splitting unit 214 comprises the active unit 207, a PSE 203. The PSE 203 is connected to the input connection element 211 and the second output connection element 213. The PSE 203 taps the power from the branched power line onto the data line and therefore the splitting unit 214 provides one power and data line (via PoDL) 220 at the second output connection element 213. This line 220 passes through the spur cable 210 to the second electronic device 201. At this second electronic device, a first integrated circuit 206a processes the data and a PD 205 is supplied with the power. Additionally, the second electronic device 201 comprises a second integrated circuit 206a, which is connected to the network via a data line 218 passing along the spur cable 210 to the second output connection element 213 of the splitting unit 214. The data obtained by the two integrated circuits is exchanged and refreshed.

This data line 218 passes through the first output connection element 215 of the splitting unit 214 along the trunk cable 208 next to the power line 216. In the depicted example, the trunk cable 208 is connected by an inline connector 217, connecting the lines to a further trunk cable.

The second depicted splitting unit 214 comprises the same components as the first one on the left. However, this splitting unit 214 is connected to a different type of second electronic device 201 at its second output connection element 213. The spur cable 210 connecting the splitting unit 214 and the second electronic device 201 contains one power and data line (via PoDL) 220, one power line 216 and one data line 218. The power and data line (via PoDL) 220 supplies the second electronic device 201 with power and data, whereas the second integrated circuit 806a is connected to the network only via a data line 218. Beside the power and data line (via PoDL) 220, the additional power line 216 is capable of powering a further component 204 of the device 201, and therefore also to power multiple nodes via one splitting unit 214.

In FIG. 4, exemplarily, the connectors 212 attached to the outlets 211 and 215 of the splitting units 214 (the one on the left and the one on the right in FIG. 4) comprise exemplarily four pins. Two pins are provided for the data transfer and two pins for the power transfer. The connector 212 attached to the outlet 213 comprises a different number of pins for the splitting unit depicted on the left of the image in comparison to the one on the right of the image. The connector 212 at the outlet 213 of the splitting unit on the left of FIG. 4 comprises four pins. In other words, four wires pass along the spur cable 210. However, the connector 212 at the outlet 213 of the splitting unit on the right comprises six pins, since beside of the one power and data line (via PoDL) 220 and the extra power line 216 also an extra data line 218 is transferred along the spur cable 210.

The exemplary cable length a_2, including spur and trunk cables between two second electronic devices 201 that receive and send data via the network is 40 m with an exemplary transfer rate of 1 Gbit/s.

The choice of configuring the network in a multidrop or P2P topology solely depends on the length and speed the application can support and should support.

The circuit diagram for this embodiment is omitted here but the configuration can be deduced clearly from the example shown in FIG. 3, by adding one data line passing through the outlet 113 to the outlet 115 in FIG. 3.

Figure 5:
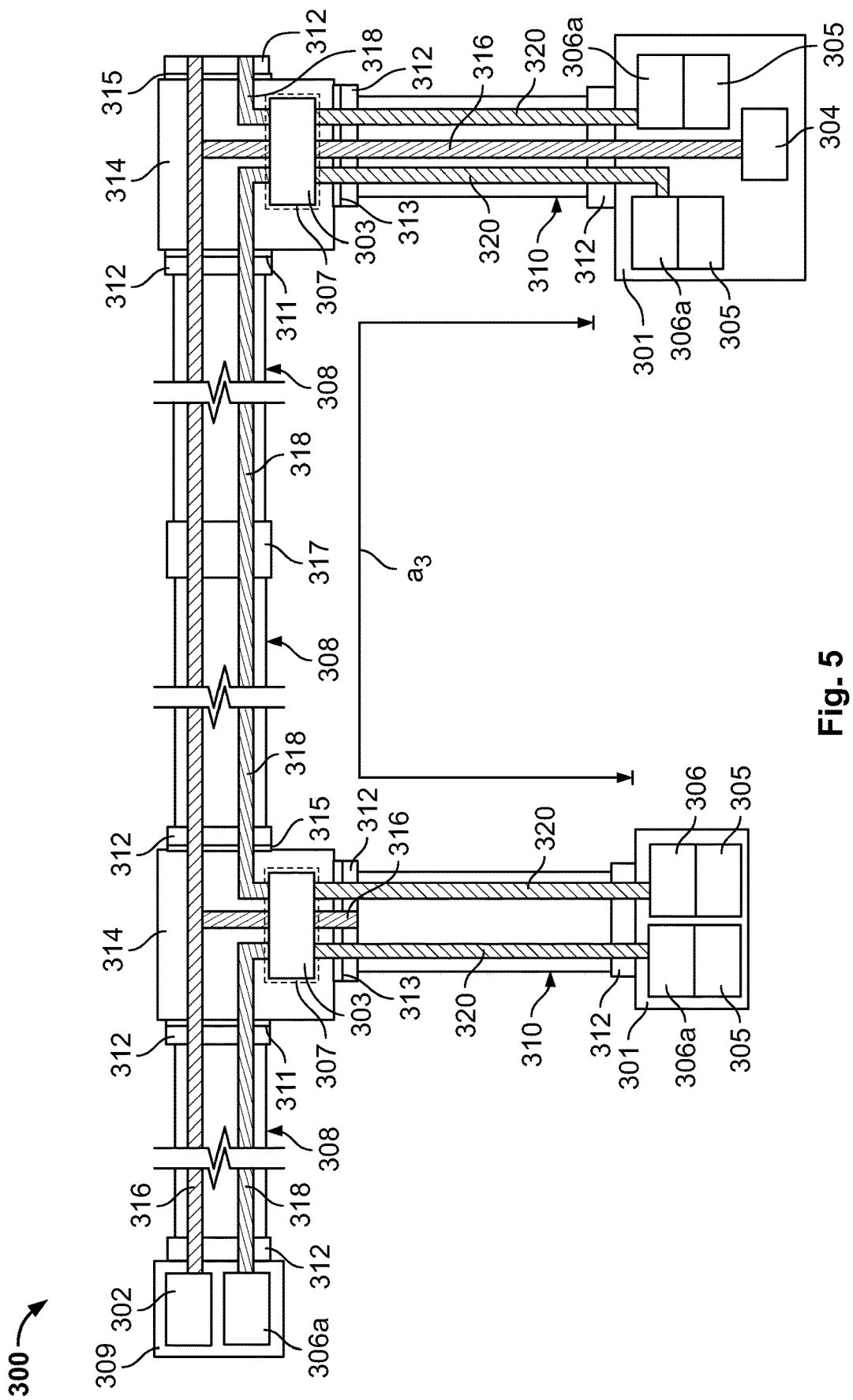
FIG. 5 is a schematic diagram of an Ethernet system with a splitting unit according to another embodiment.

Another further advantageous example of the present disclosure with the network in a P2P topology is shown schematically in FIG. 5.

In this example, the first electronic device 309 comprises an external (non-PoDL) PSE 302 for supplying power and an integrated circuit 306a, exemplarily chosen as PHY, for processing the data. The trunk cable 308 passing along the input connection element 311 and the first output connection element 315 of the splitting units 314 comprises a power line 316 and a data line 318.

The splitting unit 314 splits the power line 316, and one branch passes through the first output connection element 315 to the second splitting unit 314 and the other branch passes through the second output connection element 313 to the second electronic device 301. The data line 318, received through the input connection element 311 is led to the active unit 307 and then to the second output connection element 313.

On the branch passing through the second output connection element 313, the splitting unit 314 comprises the active unit 307, a PSE 303. The PSE 303 is connected to the input connection element 311 and the output connection elements 313, 315. The PSE 303 taps the power from the branched power line onto the data line and therefore the splitting unit 314 provides one power and data line (via PoDL) 320 at the second output connection element 313. This one power and data line (via PoDL) 320 passes through the spur cable 310 to the second electronic device 301. At this second electronic device, a first integrated circuit 306a processes the data and a first PD 305 is supplied with the power. Additionally, the second electronic device 301 also comprises a second integrated circuit 306a and a second PD 305. Those components are connected to the second output connection element 313 of the splitting unit 314 via the spur cable 310 with a second power and data line (via PoDL) 320. The second power and data line (via PoDL) 320 passes the active unit and then the first output connection element 315 to the trunk cable 308.

The data signal received by the integrated circuits 306a at the second electronic device 301 is exchanged and fed into the network. As can be seen in FIG. 5, the power and the data line passing along the trunk cable 308 are separated lines. The splitting unit only provides one power and data line (via PoDL) for connecting an external device via the spur cable 310. Additionally, as in the previous example, the splitting unit 314 may also provide one separate power line 316 at the second output connection element 313 for connecting a further node.

In FIG. 5, exemplarily, the connectors 312 attached to the outlets 311 and 315 of the splitting units 314 (the one on the left and the one on the right in FIG. 5) comprise four pins. The connector 312 attached to the outlet 313 comprises a different number of pins for the splitting unit depicted on the left of the image in comparison to the one on the right of the image. The connector 312 at the outlet 313 of the splitting unit on the left comprises four pins meaning that four wires pass along the spur cable 310. However, the connector 312 at the outlet 313 of the splitting unit on the right comprises six pins, since beside of the one power and data line (via PoDL) 320 and the extra power line 316 also a further power and data line (via PoDL) 320 is transferred along the spur cable 310.

The exemplary cable length a_3, including spur and trunk cables between two second electronic devices 301 that receive and send data via the network is 40 m with an exemplary transfer rate of 1 Gbit/s.

The circuit diagram for this embodiment is omitted here but the configuration can be deduced clearly from the example shown in FIG. 3, by adding a data line passing through the outlet 115 to the outlet 113 in FIG. 3. Before this data line exits the splitting unit at the outlet 113 the power line is tapped on this additional data line by the PoDL controller, such that in contrast to the example in FIG. 3 a second power and data line (via PoDL) would be provided at the outlet 113.

Figure 6:
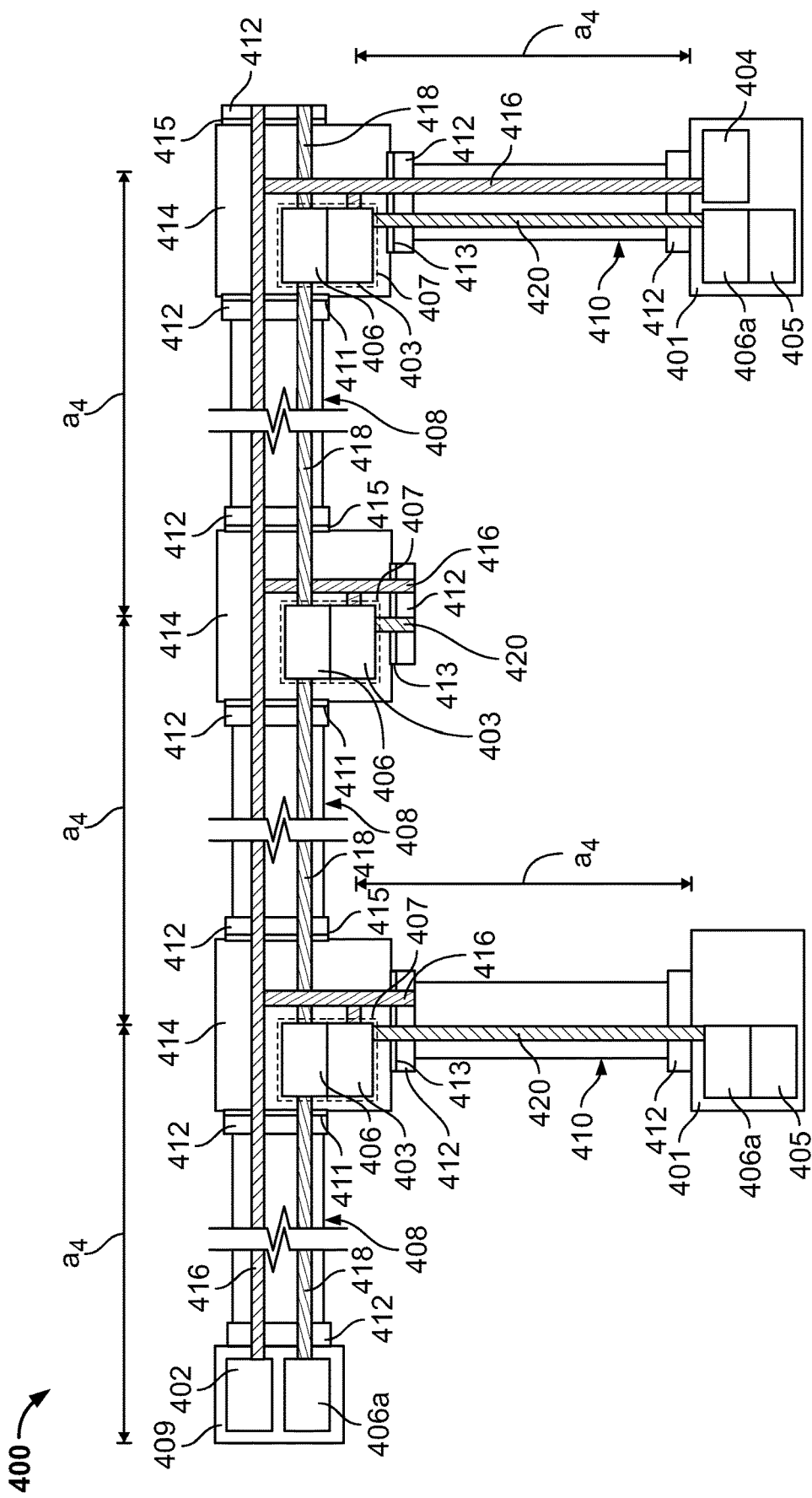
FIG. 6 is a schematic diagram of an Ethernet system with a splitting unit according to another embodiment.

Another further advantageous example of the network in a P2P configuration and the splitting unit according to the present disclosure is shown schematically in FIG. 6. The trunk cable 408 transfers power and data in a power line 416 and a data line 418, respectively. The power is supplied in the first electronic device 409 via an external (non-PoDL) PSE 402. The data signal is provided by an integrated circuit 406a in the first electronic device 409.

Further, according to an example of the present disclosure, the splitting unit 414 comprises two active units 407, an SPE switching unit 406 and a PSE 403. The SPE switching unit 406 is connected to the input connection element 411 and the output connection elements 415 and 413. The PSE 403 is connected to the input connection element 411 and the second output connection element 413. The splitting unit splits the data and the power signal into two cables, one extending in a horizontal dimension in the trunk cable and one in a vertical dimension in the spur cable. The split branch is connected via the spur cable 410 to the second electronic device 401. Further, the SPE switching unit 406 can switch between the two split data lines and therefore allocates the data between the output connection elements 413, 415. The second electronic device comprises an integrated circuit 406a for processing the data and one PD 405 that is powered by the supplied power. The integrated circuit 406a may be fabricated from semiconductor material, such as silicon.

The power signal passing along the trunk cable 408 through the splitting unit 414 is also branched off to be able to pass power along the spur cable 410. The PSE 403 taps the power from the branched power line 416 onto the data line 418.

With the power tapped onto the data line, the second electronic devices 401 are connected to the splitting units 414 at the second output connection element 413 via a PoDL cable, which is capable of providing data at an integrated circuit 406a of the second electronic device 401. This integrated circuit 406a can be a SPE transceiver. Further, the PoDL cable 420 also provides power for the corresponding power element 405 of the second electronic device 401.

At the first output connection element 415, the splitting unit 414 is exemplarily connected to another further splitting unit 414 (in the middle of FIG. 6) via the trunk cable 408. Between these splitting units 414 data and power is transferred. The data passing through the first splitting unit 414 is refreshed by the SPE switching unit 406 and passed to the next splitting unit 414. This feature advantageously allows to increase the distances between two devices, while at the same time allows to transfer data at a high transfer rate. With the presented splitting unit 414 in the first example, the distance a_4 in the trunk line between two splitting units 414 or between the first electronic device 409 and one splitting unit 414 can be exemplarily up to 40 m with an exemplary transfer rate of 1 Gbit/s. The setup allows a reduced number of components even in a large network. Additionally, with the integration of the active unit 407 the exemplary length a_4 of the spur cables 410 is increased to up to 40 m with an exemplary transfer rate of 1 Gbit/s. This again, enables the use of the PoDL technology over large cable lengths. The reached cable lengths and the transfer rates in the trunk and spur cable correspond to the requirement for the IEEE 802.3 bp standard 1000BASE-T1. The SPE switching unit may comprise at least one integrated circuit such as a SPE transceiver or a comparable component. For the functionality of the system it is not required that the SPE switching units 406 in the different splitting units 414 comprise the same type and/or number of components.

Further, the integrated circuit 406a exemplarily comprises at least one SPE transceiver, physical layer (PHY) chip to enable the transfer between a purely digital system and the physical medium and one Ethernet switch, both implemented on one integrated circuit. However, the at least one SPE transceiver and the Ethernet switch may also be implemented on two different integrated circuits. The integrated circuits increase the transfer rate that can be transferred through and from the splitting unit 414 while at the same time are extremely small sized and have a very low power consumption. Integrating the SPE switching unit to the splitting unit 414 has the advantage that, although the input signal is split into two output signals, the signal disturbance on the trunk cable is still limited and does not increase. Therefore, spur cable lengths of longer than 10 cm are feasible.

As can be seen in FIG. 6, the second splitting unit 414, exemplarily depicted with the same components in the active unit as the first splitting unit on the left, is not connected to a second electronic device 401 at the second output connection element 413. Also in this case, the active unit 407 taps the power from the power line onto the data line. However, the provided power and data line (via PoDL) 420 at the second output connection element 413 is not further used. Here, mainly the data signal on the data line 418 is refreshed and transferred to the third splitting unit 414 (on the right of FIG. 6).

In another configuration shown on the right of FIG. 6, the splitting unit 414 may also output one power and data line (via PoDL) 420 and one additional power line 416 at the second output connection element 413. This power line 416 is a branch of the main power line 416 in the trunk cable 408. With this extra power line 416, a further PD component 404 in the electronic device 401 can be supplied with power. Therefore, the splitting unit 414 not only provides power to one node, which is the standard for the PoDL technology, but also to multiple nodes when additionally providing the separate power line at the second output connection element 413.

FIG. 6 depicts the various modes of the splitting unit 414. Power and data can be distributed on one PoDL, or beside the PoDL an extra power line is provided, or the splitting unit only refreshes the signal without connecting a node.

In FIG. 5, exemplarily, the connectors 412 attached to the outlets 411 and 415 of the splitting units 414 (all three depicted) comprise four pins. The connector 412 attached to the outlet 413 comprises a different number of pins for the splitting unit depicted on the left of the image in comparison to the one on the right of the image. The connector 412 at the outlet 413 of the splitting unit on the left comprises two pins meaning that two wires pass along the spur cable 410. The connector 412 at the outlet 413 of the splitting unit on the right comprises four pins, since beside of the one power and data line (via PoDL) 420 one the extra power line 416 is transferred along the spur cable 410.

Figure 7:
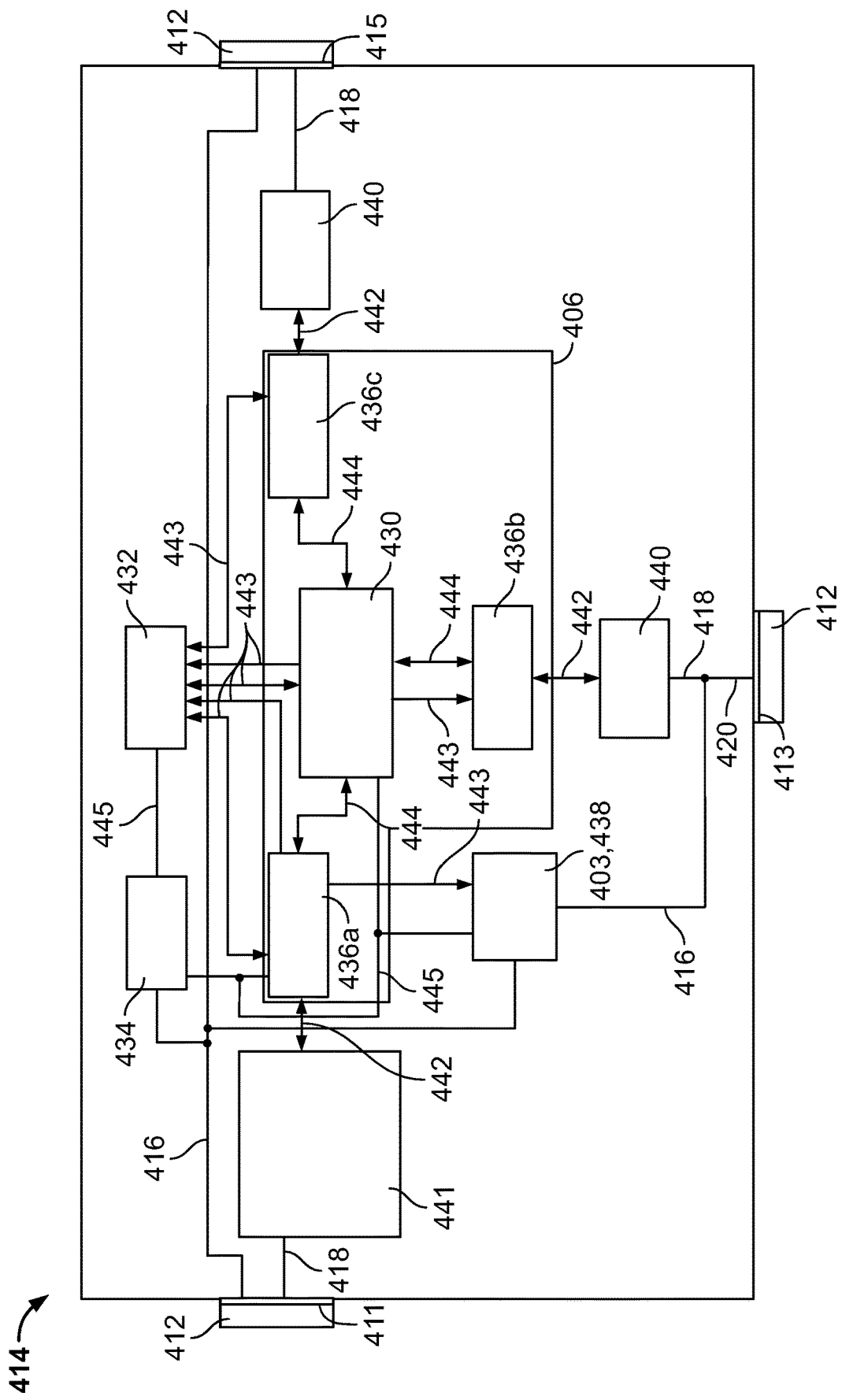
FIG. 7 is a circuit diagram of a splitting unit according to an embodiment.

An exemplary circuit design of the splitting unit 414 with the active units is shown in a first configuration in FIG. 7. This exemplary circuit diagram corresponds to the splitting unit 414 with one input connection element 411 and a first output connection element 415, which are provided with power 416 and data 418 via separate lines and a second output connection element 413, which is provided with power and data via one line, PoDL 420.

The splitting unit 414 comprises one SPE switching unit 406 and one PSE 403. The power line passing from the first input connection element 411 to the first output connection element 415 is tapped and the branched power line leading to the second output connection element 413 may supply a 1-port PSE controller 438. This controller 438 is operable to control the injection of the power line 416 to the data line 418. Thus, the splitting unit provides only one power and data line (via PoDL) 420 at the second output connection element 413.

The splitting and switching of the data line is explained in the following. The SPE switching unit 406 exemplarily comprises one Ethernet 3-port switch 430 and three SPE transceivers, PHYs, 436*a*, 436*b*, 436*c*. Every PHY 436*a*, 436*b*, 436*c* is connected bi-directionally to one of the Ethernet ports of the switch 430 via a media independent interface (MII) 444 or reduced media independent interface (RMII). The PHYs 436*a* and 436*c* are placed on the main data line passing from the input connection element 411 to the first output connection element 415. The PHY 436*b* is placed on the branch of the main line that is connected to the second output connection element 413. The switch 430 enables the splitting of the main line and allows selectively switching between the split lines. Although in this example two active units, one SPE switching unit and one PSE are depicted, it is clear that also more than two active units and therefore multiple PSEs and/or multiple SPE switching units may be incorporated to the splitting unit. Further, it is clear that the SPE transceivers 436*a*, 436*b*, 436*c* may be also any other type of integrated circuit and are not limited to PHYs.

The data line 418 passing through the input connection element 411 along the trunk cable is connected to a transformer unit 441. This transformer unit 441 comprises a transformer, a common mode choke to suppress interfering frequencies and a transient voltage suppressor (TVS) diode to protect the electronics against damaging voltage transients such as electrostatic discharge (ESD). The transformer unit 441 is connected to the PHY 436*a* via the media dependent interface (MDI) 442. At the first output connection element 415 the PHY 436*c* again is connected to a transformer 440 with the filter elements via a MDI connection 442 before being connected to the first output connection element 415. Similarly, the PHY 436*b* is connected to a transformer 440 with the filter elements and then to the second output connection element 413. Before the data line 418 exits the splitting unit 414 at the second output connection element 413, the power line 416 is tapped onto the data line 418.

Further, the splitting unit 414 also comprises a host CPU 432, which is supplied with power by a PSU 434. The power supply unit 434 converts the power on the power line 416 to a lower power for the components of the splitting unit 414. Beside of the CPU 432, the PSU 434 is connected to the PHY 436*a*, the Ethernet switch 430 and the PSE controller 438 and supplies power 445 to these components. The host CPU 432 is connected bi-directionally with the PHYs 436*a* and 436*c* and the Ethernet switch 430 via a MDIO 443 interface to read and write the control and status registers of the PHYs.

Figure 8:
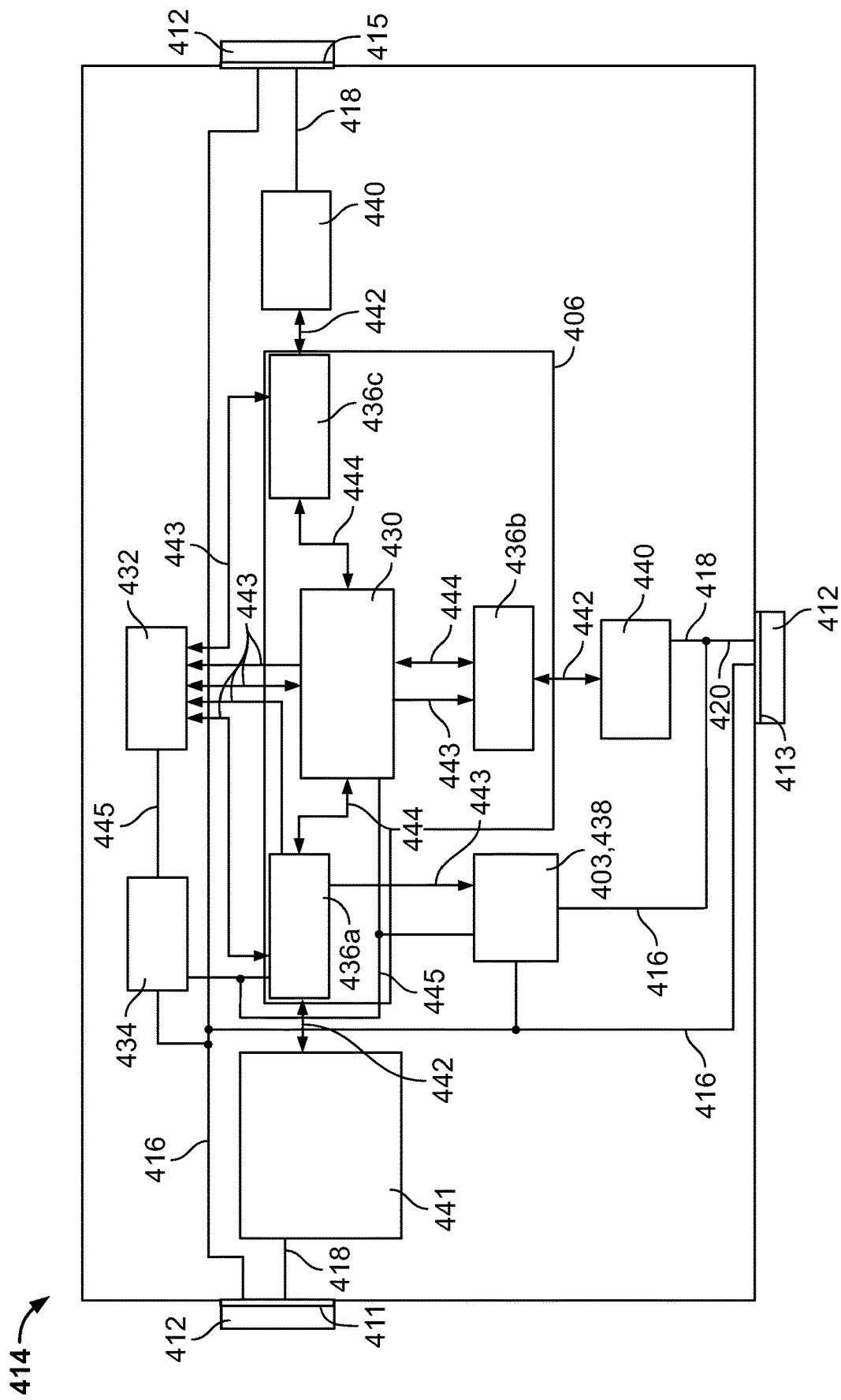
FIG. 8 is a circuit diagram of a splitting unit according to another embodiment.

In FIG. 8, again the splitting unit 414 is depicted, but with an additional power line 416 that is provided at the second output connection element 413. This power line does not pass the PSE controller 438 but is directly connected to the second output connection element 413. This diagram corresponds to an example of the splitting unit 414 that is also shown in FIG. 6.

Figure 9:
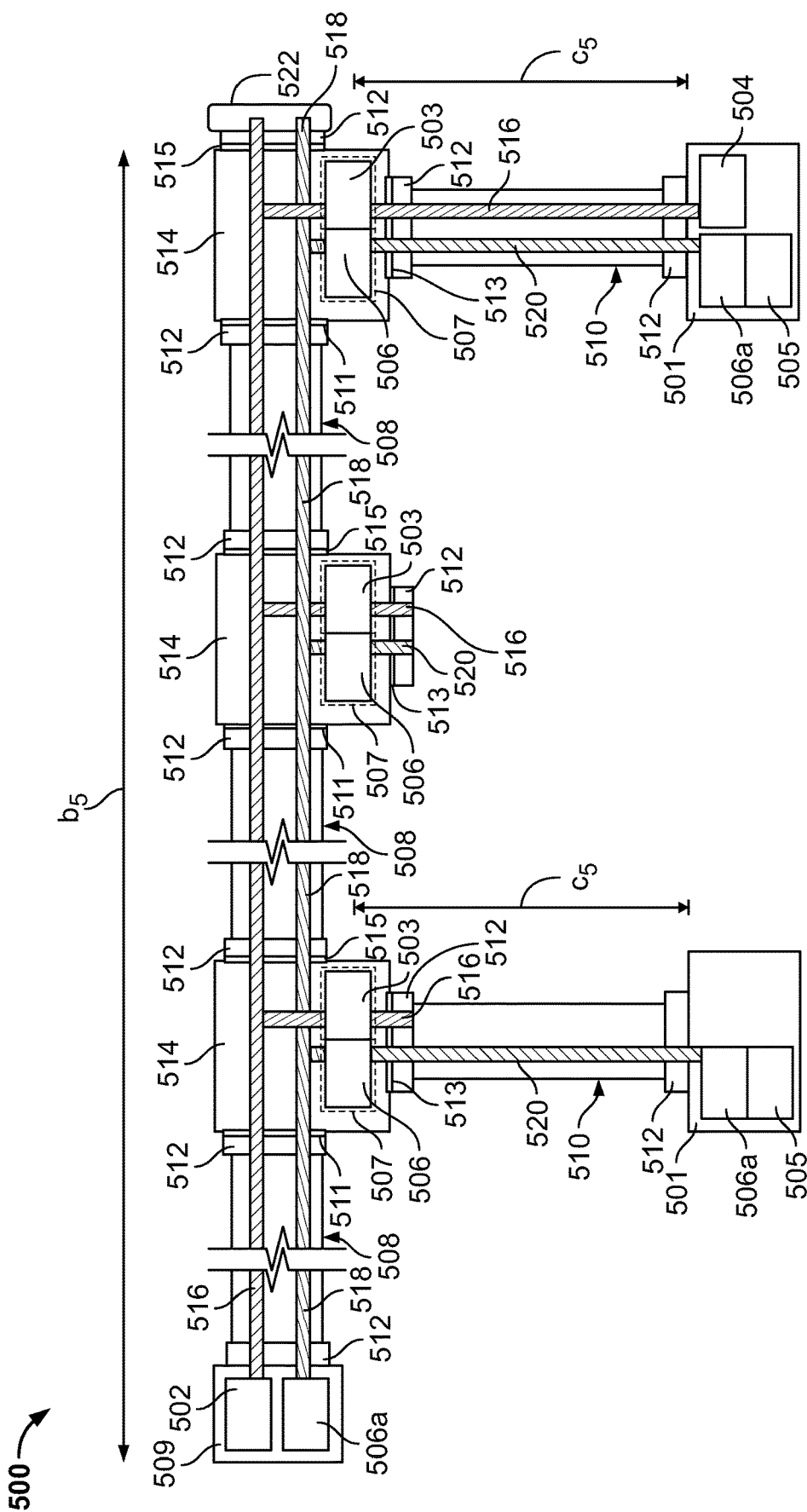
FIG. 9 is a schematic diagram of an Ethernet system with a splitting unit according to another embodiment.

Another further advantageous example of the present disclosure with the network in a multidrop topology is shown schematically in FIG. 9. The splitting unit 514 also comprises two active units 507, but with a different configuration. As can be seen, the SPE switching unit 506 is placed in parallel to the PSE 503. Also the SPE switching unit is not located on the trunk line passing through the splitting unit 514, but on the branched line going to the second electronic device 501. The SPE switching unit 506 is connected to the input connection element 511 and the second output connection element 513. The PSE 503 is connected to the input connection element 511 and the second output connection element 513.

In this example, the first electronic device 509 comprises one integrated circuit 506*a* and one external (non-PoDL) PSE 502 that supplies power to the network. The second electronic device 501 comprises on integrated circuit 506*a* and one powered device 505, which is powered by the network. Additionally, the second electronic device 501 may also comprise a second PSE 504, which can be powered by an additional power line.

In this configuration, the PSE 503 in the splitting unit 514 again allows tapping power from the power line onto the data line and therefore establishes a PoDL signal 520 at the second electronic device 501 via the spur cable 510. However, with the different position of the SPE switching unit 506, the trunk line consisting of a power 516 and a data line 518 is fed through the splitting unit 514 without a refreshing of the data signal. Therefore, the exemplary total trunk cable length b_5 that is feasible with this setup is 25 m with an exemplary transfer rate of 10 Mbit/s.

In the splitting unit 514, the power line 516 and the data line 518 are branched off and at the vertical branch of the data line 518 the SPE switching unit is located. Therefore, the data signal is only refreshed in this vertical dimension. Thus, after tapping the power onto the data line, the exemplary spur cable 510 with one power and data line (via PoDL) 520 connecting the second electronic device 501 reaches a length c_5 of up to 1 km with an exemplary transfer rate of 10 Mbit/s.

Including the splitting unit 514 to this multidrop topology allows to use 10BASE-T1S in the trunk cable and 10BASE-T1L in the spur cables. Therefore, this configuration of the splitting unit 514 is applicable for networks where the distance between the trunk cable and the external devices is very high.

Again, the splitting unit 514 allows various modes of providing power and data at the second output connection element 513. Either one power and data line (via PoDL) 520 passes through the spur cable 510 to the second electronic device 501, no spur cable and hence no second electronic device is connected to the second output connection element 513 and the power and data signal is just fed through the splitting unit 514. Alternatively, the second electronic device 501 is not only connected to one power and data line (via PoDL) 520, but also to an extra power line 516. Therefore, it is again possible to power multiple nodes via the splitting unit 514. The reachable length c_5 of the spur cable 510 for this last mode is the same as mentioned above. Depending on the connection mode of the splitting unit 514, the split lines are either connected to the device 501 or just terminated at the second output connection element 513.

In FIG. 9, exemplarily, the connectors 512 attached to the outlets 511 and 515 of the splitting units 514 (all three depicted) comprise four pins. The connector 512 attached to the outlet 513 comprises a different number of pins for the splitting unit depicted on the left of the image in comparison to the one on the right of the image. The connector 512 at the outlet 513 of the splitting unit on the left comprises two pins meaning that two wires pass along the spur cable 510. The connector 512 at the outlet 513 of the splitting unit on the right comprises four pins, since beside of the one power and data line (via PoDL) 520 one the extra power line 516 is transferred along the spur cable 510.

In this multidrop Ethernet setup 500, the last splitting unit (on the right) 514 is terminated with a field termination unit 522 at the first output connection element 515. This termination unit can be of any type, and is here exemplarily chosen as terminating the data line with 100 Ohm and the power line with 0.1 µF.

Figure 10:
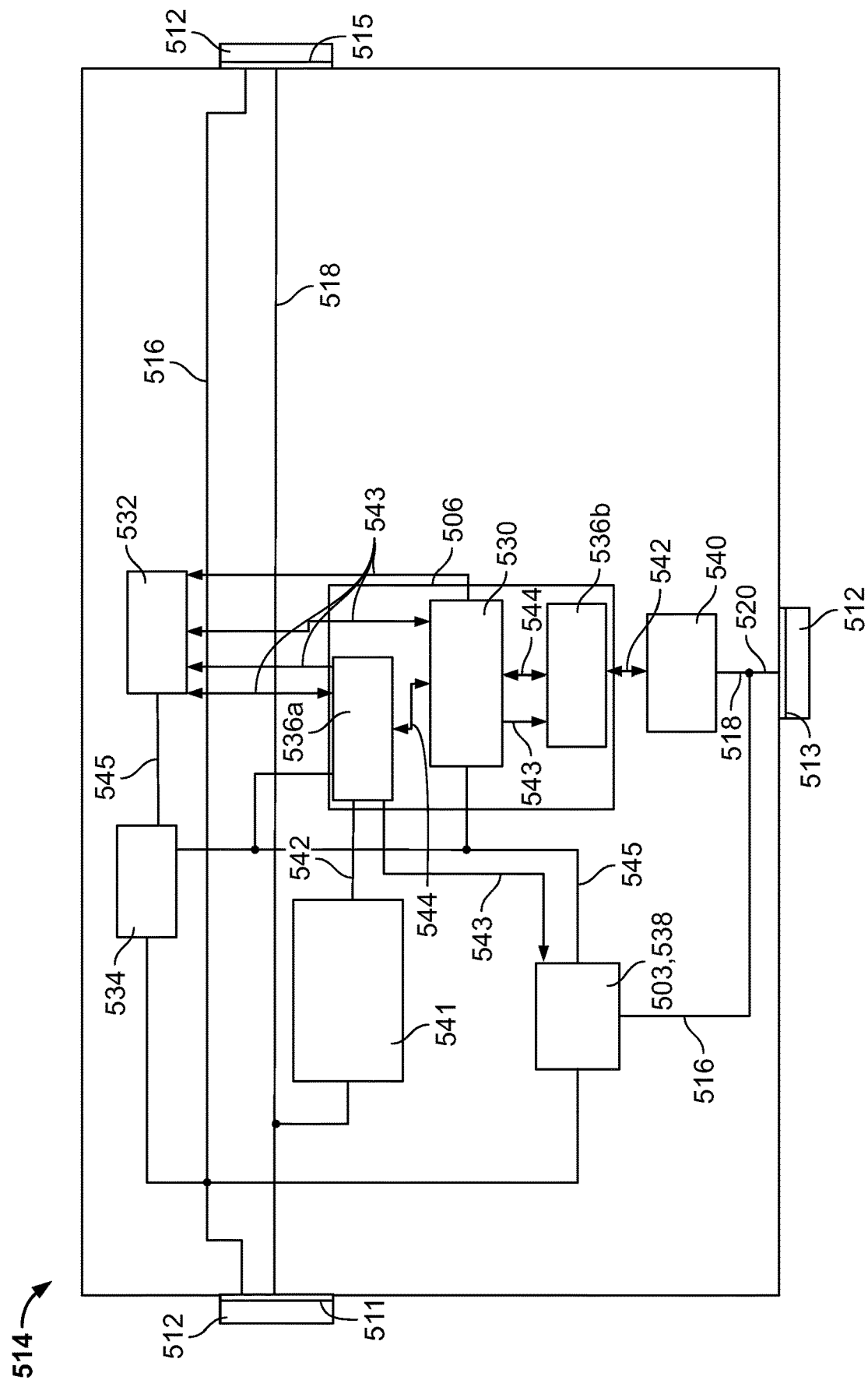
FIG. 10 is a circuit diagram of a splitting unit according to another embodiment.

An exemplary circuit design of the splitting unit 514 is shown in FIG. 10. This exemplary circuit diagram corresponds to the splitting unit 514 with one input connection element 511 and a first output connection element 515, which are provided with power 516 and data 518 via separate lines and a second output connection element 513, which is provided with power and data via one line, PoDL 520.

The splitting unit 504 comprises one PSE 503 and one SPE switching unit 506. The power line 546 passing from the first input connection element 511 to the first output connection element 515 is tapped and the branched power line leading to the second output connection element 513 may pass a 1-port PSE controller 538. This controller is operable to control the injection of the power line 516 to the data line 518. Thus, the splitting unit provides only one power and data line (via PoDL) at the second output connection element 513.

In this embodiment, the SPE switching unit 506 comprises two SPE transceivers, PHYs, 536a, 536b and one Ethernet 2-port switch 530. As can be seen in FIG. 10, the data line 518 passes along the trunk line through the splitting unit 514 from the input connection element 511 to the first output connection element 515. This data line 518 is tapped and the branched line is connected to a transformer unit 541. This transformer unit 541 comprises a transformer, a common mode choke to suppress interfering frequencies and a transient voltage suppressor diode to protect the electronics against damaging voltage transients such as electrostatic discharge. The transformer unit 541 is connected via MDI 542 to the PHY 536a. This PHY communicates bi-directionally with the Ethernet switch 530, which again communicates bi-directionally with the second PHY 536b. This PHY 536b is connected to a transformer 540 with the filter elements via MDI 542. The outgoing data line of the transformer is directed to the second output connection element 513. Before this data line 518 exits the splitting unit 514, the power line 516 is tapped onto the data line 518 to provide one power and data line (via PoDL) 520 at the second output connection element 513.

The included Ethernet switch 530 in the splitting unit 514 eliminates the disadvantages of which is present in the trunk cable, having very short spur cables, and increases the feasible spur cable length to up to 1000 m.

Further, the splitting unit 514 also comprises a host central processing unit 532, which is supplied with power by a power supply unit 534. The power supply unit 534 converts the power on the power line 516 to a lower power for the components of the splitting unit 514. Beside of the CPU 532, the PSU 534 is connected to the PHY 536a, the Ethernet switch 530 and the PSE controller 538 and supplies power 545 to these components. The host CPU 532 is connected bi-directionally with the PHY 536a and the Ethernet switch 530 via an MDIO 543 interface to read and write the control and status registers of the PHYs.

Also in this embodiment, it is possible to provide an additional power line at the second output connection element 513 that is tapped from the main power line 518.

The splitting unit provides selectively data at the devices, which keeps the transfer rate in the network high. At the same time, the complexity and number of components of the devices at every cable branch can be reduced, and a ring structure maintained. The splitting unit is capable of either providing the power via dedicated power lines or providing the power via the data lines (by applying the PoDL scheme). Additionally, the second output connection may also provide one data and power line (via PoDL) with or without one additional power line to one device. The extra power lines may, for example, deliver a voltage of up to 600 V DC and a current of up to 16 A. With the various power delivery options, the splitting unit is highly flexible and capable of providing power for different devices in different applications. The refreshing of the signal increases the cable length at which transfer rates between 10 Mbit/s and 1 Gbit/s can be maintained, while at the same time the size and amount of required connections for every cable branch is reduced.

What is claimed is:

1. A splitting unit for a single pair Ethernet (SPE) hybrid line, comprising:
    an input connection element;
    a first output connection element;
    a second output connection element, the input connection element, the first output connection element, and the second output connection element transfer power and data, at the input connection element and at the first output connection element, power is transferred via a power line and data is transferred via a data line separate from the power line; and
    an active unit providing power and data at the second output connection element, the active unit has a power sourcing equipment (PSE) connected to the input connection element and to at least one of the first output connection element and the second output connection element, the PSE taps power from the power line onto the data line to transfer the power and the data via a single data and power line at the second output connection element.

2. The splitting unit of claim 1, wherein the active unit has an SPE switching unit connected to the input connection element and at least one of the first output connection element and the second output connection element.

3. The splitting unit of claim 2, wherein the SPE switching unit allocates data to at least one of the first output connection element and the second output connection element.

4. The splitting unit of claim 1, wherein the active unit splits the data line at the input connection element and switches between a pair of split lines.

5. The splitting unit of claim 1, wherein the active unit outputs power to a plurality of electronic devices connected to the second output connection element.

6. The splitting unit of claim 1, wherein the active unit refreshes a signal on the data line.

7. The splitting unit of claim 1, wherein the splitting unit is a molded connecting unit.

8. The splitting unit of claim 7, wherein the input connection element, the first output connection element, and the second output connection element are provided as overmolded connector elements.

9. The splitting unit of claim 1, wherein at least one of a plurality of outlets of the input connection element, the first output connection element, or the second output connection element is attachable to a cable or wire by at least one of a solder connection, a crimp connection, an insulation-displacement connection, a screw connection, a pierce connection, and a poke-in connection.

10. The splitting unit of claim 1, wherein at least one of a plurality of outlets of the input connection element, the first output connection element, or the second output connection element is attachable to a separable connection by at least one of a screw connection, a latch connection, a push-pull connection, and a plug-in connection.

11. The splitting unit of claim 7, wherein the splitting unit is formed as a T-shaped connecting unit.

12. The splitting unit of claim 7, wherein the splitting unit is formed as an angled connecting unit.

13. A hybrid Ethernet power system for a single pair Ethernet (SPE) network, comprising:
a first electronic device;
a second electronic device; and
a splitting unit including an input connection element, a first output connection element, a second output connection element, the input connection element, the first output connection element, and the second output connection element transfer power and data, at the input connection element and at the first output connection element, power is transferred via a power line and data is transferred via a data line separate from the power line, and an active unit providing power and data at the second output connection element, the active unit has a power sourcing equipment (PSE) connected to the input connection element and to at least one of the first output connection element and the second output connection element, the PSE taps power from the power line onto the data line to transfer the power and the data along a single data and power line at the second output connection element, the first electronic device is connectable to the input connection element, the second electronic device is connectable to the second output connection element.

14. The hybrid Ethernet power system of claim 13, wherein the hybrid Ethernet power system transfers data and power between the first electronic device and the splitting unit.

15. The hybrid Ethernet power system of claim 14, wherein the hybrid Ethernet power system transfers data and power between the splitting unit and the second electronic device.

16. The hybrid Ethernet power system of claim 13, the splitting unit is a last splitting unit terminated with a field termination unit at the first output connection element.

17. The hybrid Ethernet power system of claim 13, wherein the splitting unit is a molded connecting unit.

18. The hybrid Ethernet power system of claim 17, wherein the input connection element, the first output connection element, and the second output connection element are connected to a mating connector element attached to a cable.

19. A splitting unit for a single pair Ethernet (SPE) hybrid line, comprising:
an input connection element;
a first output connection element;
a second output connection element, the input connection element, the first output connection element, and the second output connection element transfer power and data; and
an active unit providing power and data at the second output connection element, the active unit has a power sourcing equipment (PSE) connected to the input connection element and to at least one of the first output connection element and the second output connection element, the PSE taps power from a power line onto a data line, the active unit refreshes a signal on the data line.

* * * * *